June 18, 1957 C. T. RASMUSSEN ET AL 2,795,911
HINGED OFFSET DISK HARROW

Filed Aug. 13, 1954 2 Sheets-Sheet 1

INVENTORS.
CLARENCE T. RASMUSSEN
WILLIAM R. FRANK
EARL H. DOUGLAS
BY
ATTORNEYS

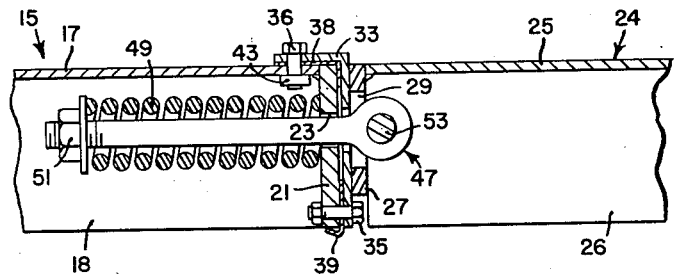
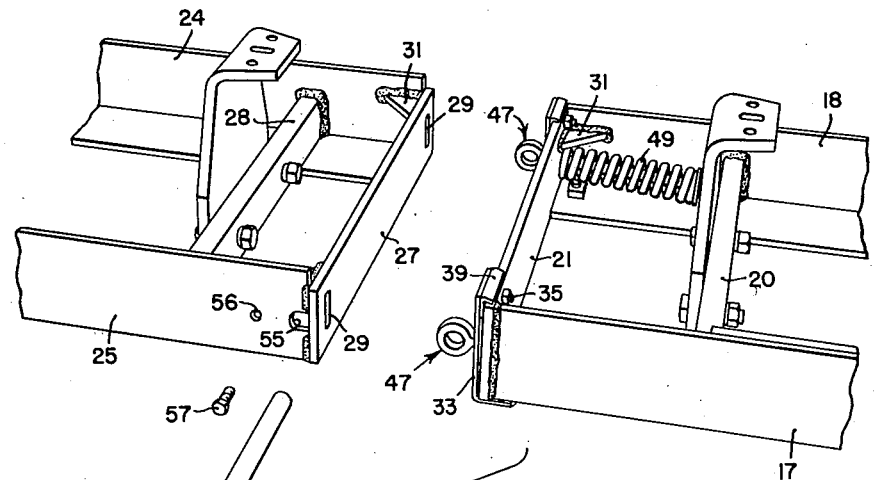

2,795,911

HINGED OFFSET DISK HARROW

Clarence T. Rasmussen, Alhambra, William R. Frank, Bell, and Earl H. Douglas, Inglewood, Calif., assignors to John Deere Killefer Company, Los Angeles, Calif., a corporation of California Application August 13, 1954, Serial No. 449,736

7 Claims. (Cl. 55—81)

The present invention relates generally to agricultural implements and more particularly to disk harrows, especially relatively wide disk harrows adapted for use over uneven terrain.

The object and general nature of the present invention is the provision of an offset disk harrow especially arranged and constructed to have generally vertical flexibility, so as to operate satisfactorily over uneven terrain, but which includes means yieldably resisting any vertical flexing of one section relative to the other, so as to insure a generally level operating implement when using the latter on substantially level ground.

More specifically, it is a feature of this invention to provide a disk harrow having a pair of end-to-end arranged frame sections, with new and improved hinge means interconnecting the adjacent end portions of said sections whereby the sections are normally maintained in a level or horizontal position but in which the sections may flex, one relative to the other in a generally vertical direction when appreciable forces are encountered tending to cause such flexing, as when going through a swale, over a rise, or the like.

A further feature of this invention is the provision of means providing for resiliently biased pivot means interconnecting the two sections, constructed and arranged to accommodate relative vertical movement of one section relative to the other, with means for preventing any fore-and-aft movement of one section relative to the other.

These and other objects and advantages of the present invention will be apparent to those skilled in the art after a consideration of the following detailed description, taken in conjunction with the accompanying drawings, in which:

Fig. 2 is an exploded underside view of the spring-biased pivotal connecting means acting between the adjacent ends of the gang frames of each pair of gang frames.

Fig. 3 is a sectional view taken generally along the line 3—3 of Fig. 1.

Figure 1:
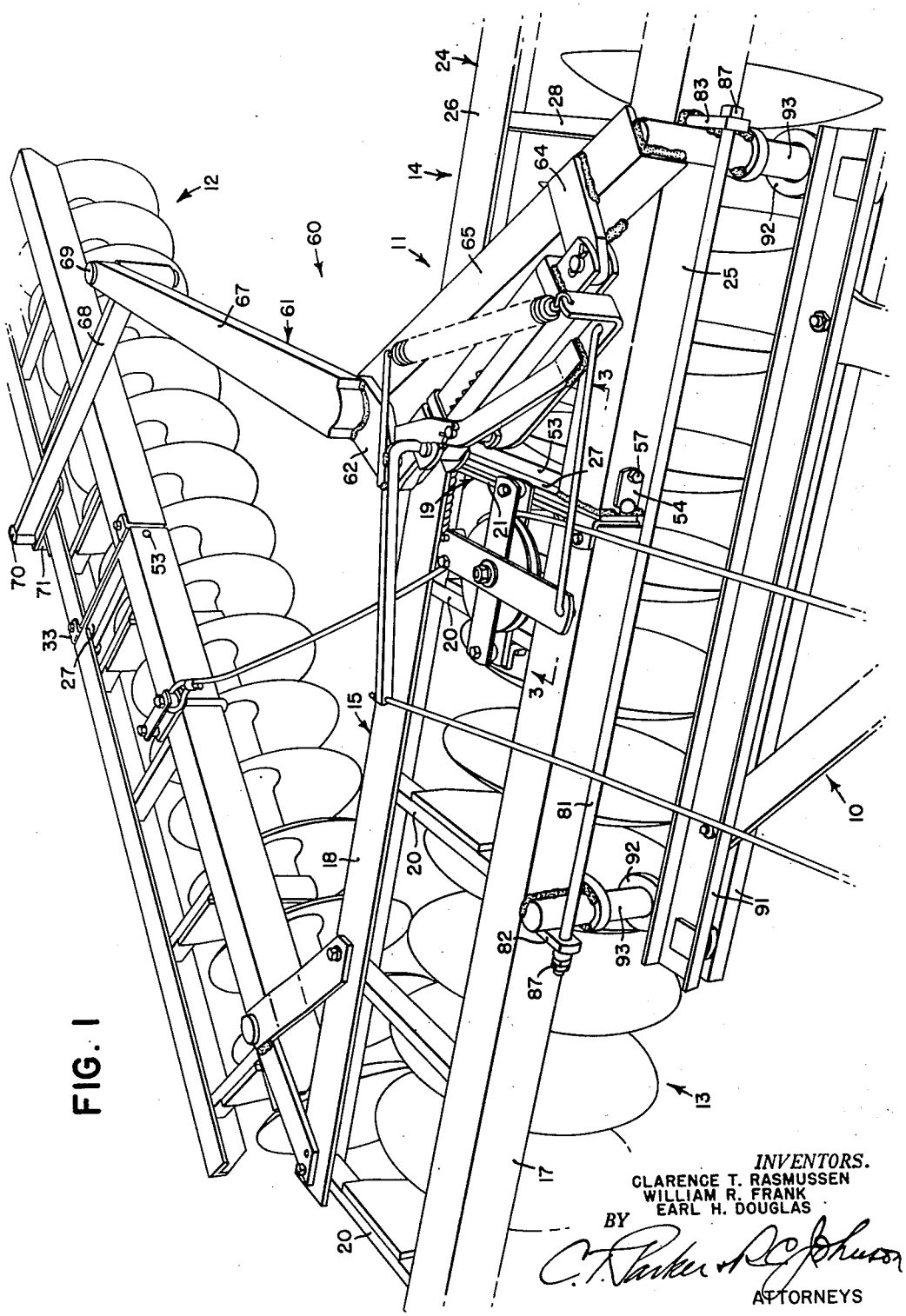
Fig. 1 is a perspective view of an offset disk harrow in which the principles of the present invention have been incorporated.

Referring now to the drawings, particularly Fig. 1, the offset disk harrow in which the principles of the present invention have been shown by way of illustration comprises a draft structure 10, a front gang means 11, and a rear gang means 12.

The front and rear gang means are substantially identical and, so far as the principles of the present invention are concerned, a detailed description of one of the gang means will suffice. The front gang means comprises a laterally inner section 13 and a laterally outer section 14. These sections are interconnected at their adjacent ends as will be disclosed in more detail later. The laterally inner gang section comprises a gang frame 15 made up of a pair of front and rear angle members 17 and 18 and end and intermediate cross members 19 and 20. Preferably, the cross members 20 are welded to the front and rear frame angles 17 and 18, and the end member 19 comprises an elongated vertical bar 21 having its ends welded to the horizontal and vertical flanges of the front and rear frame angles 17 and 18. The end bar 21 is provided with a pair of openings 23 disposed in fore-and-aft spaced apart relation, and these openings are adapted to receive hinged spring-biased eyebolts to which detailed reference will be made below.

The laterally outer front gang section 14 comprises a gang frame 24 that is substantially like the gang frame 15, having front and rear frame angles 25 and 26 suitably interconnected by end bars 27 and intermediate bars 28. The end bar 27 is reduced in width, as compared with the end bar 21, and is provided with slotted openings 29 that are spaced apart so as to aline with the openings in the adjacent end bar 21 of the inner front gang frame. Small gussets 31, welded to the end bars 21 and 27, respectively, and to the adjacent frame angles, serve to reenforce the laterally inner or pivotally interconnected ends of the front gang frames 15 and 24. A pair of wear plates 33 are fixed to the end bar 21, as by bolts 35 and 36. Associated with the bolts 36 are one or more wear plate shims 38, and associated with the lower bolt 35 is a wear plate spacer. The wear plates 33 are apertured, as are also the spacers 39 and associated portions of the end bar 21, to receive the attaching bolts 35, and the upper or angled portions 41 of the wear plates 33 are also apertured, as are the adjacent horizontal flanges of the gang frame angles 17 and 18, to receive the attaching bolts 36. The inner threaded ends of the bolts 36 are screwed into a tapped wear plate fastener 43 disposed on the underside of the associated frame angle.

The spring-biased hinged connecting means between the adjacent ends of the gang frames 14 and 15 will now be described. Such interconnecting means comprises a pair of eyebolts 47 extending through the openings 23 in the end bar 21 and the slots 29 in the end bar 27. A compression spring 49 is disposed about the shank of each of the bolts 47 and bears at one end against the inner face of the end bar 21 and at the other end against an adjusting nut 51 screwed onto the threaded end of the bolt 47. The eye portion of each of the bolts extends through the associated slot 29 in the adjacent frame end bar 27, and through the eyes of the bolts 47 a hinge pin 53 is placed. A locking plate 54 is fixed, as by welding, to one end of the eyebolt pin 53, and the vertical flanges of the frame bars 25 and 26 are provided with openings 55 to receive the pin and a second opening 56 to receive a bolt 57 that extends through the locking plate 54 and secures the latter and the eyebolt pin 53 in place, whereby the pin pivotally receives the eyebolts 47.

The rear gang frames of the disk harrow shown in Fig. 1 are equipped with the same spring-biased interconnecting means as just described, and hence further description is believed to be unnecessary.

The two gang means are interconnected by an angling mechanism which is substantially like that shown in the U. S. Patent 2,604,746 that issued July 29, 1952, to William R. Frank et al., to which reference may be made if necessary. Briefly, such angling mechanism, indicated in its entirety by the reference numeral 60, comprises a bell crank 61 having an arm 62 to which one end of an angle-determining unit 63 (which may be replaced by a hydraulic jack or the like, if desired) is connected, the other end of the unit 63 being connected to a bracket 64 that is fixed to a bar 65 carried by the front outer gang frame 14. The bell crank 61 includes a generally rearwardly extending elongated arm 67 to which a link 68 is pivotally connected by vertically extending hinge pin means 69, and the rear end of the link 68 carries a downwardly extending hinge pin 70 that is rockably disposed within a vertical sleeve 71 adjustably fixed in any suitable way to the rear angle of the laterally outer gang unit. By virtue of the hinge pin means associated with the bell crank 61 and link 68, the laterally outer disk harrow frame sections are held generally in the same plane even though each section may pivot generally vertically relative to the laterally inner frame section, as permitted by the eyebolt and hinge pin means first described above.

When either of the laterally outer gang frame units pivots or swings vertically relative to the inner unit, the springs 49 are compressed, and by virtue of the abutment bars 21 and 27, the normal tendency of the springs 49 is to yieldingly retain the gang frames against their relative vertical swinging. Thus, the two harrow sections are normally held in a level position by the springs 49 and retained in that position until an appreciable force is applied thereto, such as going through a swale or over a rise in the ground, whereupon the springs 49 then yield and permit the harrow to flex so as to accommodate the uneven terrain and, at the same time, secure uniform working of the soil.

Since the abutting bar 21 is fairly narrow, the vertical flexing of the harrow units may readily occur. However, due to the fore-and-aft spacing between the eyebolts 47, the harrow gang frames are held against any fore-and-aft swinging by the springs 49.

In some cases, in the construction just described, there in some tendency for the laterally outer frame section to swing rearwardly in a generally horizontal direction even though the spacing between the eyebolts 47 is relatively great. This is due to the excessive forces applied to the front gang by the draft structure that is, as best shown in Fig. 1, connected directly to the inner and outer gang frame sections 15 and 14, these stresses being, of course, in addition to those arising by virtue of soil pressure against the disks of either section. In order to take care of these excess stresses and to prevent the front frame section from opening up, we provide a tie bar 81 disposed substantially directly in front of the front frame angles 17 and 25 and connected to the latter, respectively, by apertured lugs 82 and 83 fixed to the angles 17 and 25, the ends of the tie rod 81 extending through the lugs 82 and 83 and carrying at their outer ends lock nut means 87 or the equivalent. The rod 81 fits with sufficient looseness in the apertures in the lugs 82 and 83 so as to accommodate the necessary amount of vertical flexing of the front frame sections one relative to the other, as when passing over uneven ground, yet the rod 81 serves at all times to prevent any objectionable movement of either gang frame relative to the other in a horizontal direction.

The draft structure 10 is principally of conventional construction, including a pair of crossbars 91 connected by loops 92 with the lower ends of a pair of draft pins 93 that are welded at their upper ends to the front frame angles 17 and 25.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. An offset disk harrow comprising a pair of gang means pivotally connected together to swing relative to one another about a generally vertical axis, each gang means including a pair of generally vertical abutting sections, one having appreciable area of contact with the other in end-to-end relation, and resilient means connected to act transversely of and generally midway between the upper and lower portions of said sections to maintain said abutting relation but constructed and arranged to provide for both upward and downward movement between said sections about a generally transverse horizontal axis.

2. An offset disk harrow comprising a pair of pivotally interconnected gang means adapted to swing one relative to the other about a generally vertical axis, each gang means including a pair of gang sections disposed in end-to-end abutting relation, spring means interconnecting and disposed to act generally centrally between the abutting portions of each pair of gang sections, and said abutting portions being substantially flat whereby said spring means act to resist movement of one gang relative to the other in a plurality of directions.

3. An offset disk harrow as defined in claim 2, further characterized by said spring means being arranged to offer greater resistance to movement of one section relative to the other in a generally horizontal plane than in a generally vertical direction.

4. In a disk harrow, a pair of gang frames arranged in generally end-to-end relation, one frame including an elongated generally flat end bar having a pair of fore-and-aft spaced openings therein, the other frame also including an elongated generally flat end bar having a pair of force-and-aft spaced slots, the spacing of which corresponds to the spacing between said openings, said end bars being disposed in generally vertical planes, eyebolts disposed in said openings, a spring confined between the shank end of each bolt and the adjacent end bar, the eye portions of said bolts extending through said slots, and hinge pin means extending through said eye portions.

5. In a disk harrow, a pair of gang frames arranged in generally end-to-end relation, spring-biased hinged means interconnecting said gang frames and constructed and arranged to yieldably hold them against either upward or downward displacement from a generally coplanar relation, and tie means interconnecting the front portions of said gang frames to prevent generally fore-and-aft swinging of either gang relative to the other.

6. The invention set forth in claim 5, further characterized by said tie means including a rod connected loosely at its ends to the front portions of said gang frames and disposed in front of said hinged connecting means.

7. In a disk harrow, a pair of gang frames arranged in generally end-to-end relation, front and rear spring biased hinged means interconnecting front and rear portions, respectively, of the adjacent ends of said gang frames, whereby the latter may move one relative to the other in a generally vertical direction about a generally horizontal axis, and tie means interconnecting the front portions of said gang frames to prevent the front hinged connecting means from opening up more than the rear hinged connecting means.

References Cited in the file of this patent

UNITED STATES PATENTS

| 1,188,119 | Tyrell | June 20, 1916 |
| 2,062,756 | McKahin | Dec. 1, 1936 |
| 2,604,746 | Frank et al. | July 29, 1952 |
| 2,610,453 | White | Sept. 16, 1952 |

FOREIGN PATENTS

| 938 | Great Britain | of 1915 |